US007201963B2

(12) United States Patent
Hartley et al.

(10) Patent No.: US 7,201,963 B2
(45) Date of Patent: Apr. 10, 2007

(54) PRE-PROCESSED WORKPIECE HAVING A SURFACE DEPOSITION OF ABSORBER DYE RENDERING THE WORKPIECE WELD-ENABLED

(75) Inventors: Scott M. Hartley, Clarks Summit, PA (US); Robert A. Sallavanti, Dalton, PA (US)

(73) Assignee: Gentex Corporation, Carbondale, PA (US)

( * ) Notice: Subject to any disclaimer, the term of this patent is extended or adjusted under 35 U.S.C. 154(b) by 0 days.

(21) Appl. No.: 10/047,006

(22) Filed: Jan. 15, 2002

(65) Prior Publication Data

US 2004/0038023 A1    Feb. 26, 2004

(51) Int. Cl.
*B32B 27/06*    (2006.01)
(52) U.S. Cl. .................................... 428/411.1
(58) Field of Classification Search ............ 428/411.1; 156/272.8; 106/31.13, 31.14, 31.27
See application file for complete search history.

(56) References Cited

U.S. PATENT DOCUMENTS

| 3,424,890 A | 1/1969 | Van Ruyven |
| 3,560,291 A | 2/1971 | Foglia et al. |
| 3,705,043 A | 12/1972 | Zabiak |
| 4,029,535 A | 6/1977 | Cannon et al. |
| 4,069,080 A | 1/1978 | Osborne |
| 4,156,626 A | 5/1979 | Souder |
| 4,389,452 A | 6/1983 | Chahroudi et al. |
| 4,391,764 A | 7/1983 | Edinger et al. |
| 4,424,435 A | 1/1984 | Barnes, Jr. |
| 4,606,859 A | 8/1986 | Duggan et al. |
| 4,619,990 A | 10/1986 | Elmasry |
| 4,657,345 A | 4/1987 | Gordon |
| 4,680,375 A | 7/1987 | Elmasry |
| 4,726,008 A | 2/1988 | Renaud |
| 4,824,947 A | 4/1989 | Stark |
| 4,824,948 A | 4/1989 | Stark et al. |
| 4,879,450 A | 11/1989 | Valentin et al. |
| 4,892,584 A | 1/1990 | Chapman |
| 4,906,320 A | 3/1990 | Powers |
| 4,933,110 A | 6/1990 | Tucker |
| 4,969,969 A | 11/1990 | Powers |
| 5,005,926 A | 4/1991 | Spielberger |
| 5,036,511 A | 7/1991 | Goldberg et al. |
| 5,053,440 A | 10/1991 | Schueler et al. |
| 5,093,147 A | 3/1992 | Andrus et al. |

(Continued)

FOREIGN PATENT DOCUMENTS

CA    1 125 155    6/1982

(Continued)

OTHER PUBLICATIONS

Ullmann's Encyclopedia of Industrial Chemistry, 5th Edition, vol. A 18: Paints and Coatings, pp. 359-368, May 1994.*

(Continued)

*Primary Examiner*—Ramsey Zacharia
(74) *Attorney, Agent, or Firm*—Keusey, Tutunjian & Bitetto, P.C.

(57) ABSTRACT

A weldable workpiece prepared by depositing on a surface of the workpiece, an absorber dye possessing strong absorption and a high extinction coefficient. The dye is deposited at a uniform density and thereby has the capacity to convert inbound radiant energy over about 0.1 J per square millimeter into thermal energy via vibronic relaxation and exothermic decomposition. In optical applications, the workpiece forms welds of high photopic and optical transmission. A method for preprocessing the workpiece describes steps for selecting polymers, dyes and vehicles.

2 Claims, 3 Drawing Sheets

U.S. PATENT DOCUMENTS

| | | |
|---|---|---|
| 5,113,479 A | 5/1992 | Anderson et al. |
| 5,115,379 A | 5/1992 | Nagai |
| 5,129,977 A | 7/1992 | Leatherman |
| 5,151,149 A | 9/1992 | Swartz |
| 5,229,507 A | 7/1993 | Baumann et al. |
| 5,252,262 A | 10/1993 | Patel |
| 5,264,099 A | 11/1993 | Szczyrbowski et al. |
| 5,279,693 A | 1/1994 | Robinson et al. |
| 5,419,968 A | 5/1995 | Okada et al. |
| 5,501,759 A | 3/1996 | Forman |
| 5,516,899 A | 5/1996 | Campbell et al. |
| 5,576,377 A | 11/1996 | El Sayed et al. |
| 5,630,979 A | 5/1997 | Welz et al. |
| 5,686,639 A | 11/1997 | Cohen |
| 5,792,822 A | 8/1998 | Miyabayashi et al. |
| 5,833,743 A | 11/1998 | Elwakil |
| 5,837,042 A | 11/1998 | Lent et al. |
| 5,843,265 A | 12/1998 | Grimm |
| 5,866,644 A | 2/1999 | Mercx et al. |
| 5,888,331 A | 3/1999 | Greig |
| 5,893,959 A | 4/1999 | Muellich |
| 5,897,694 A | 4/1999 | Woolf |
| 5,920,908 A | 7/1999 | Widdemer |
| 5,976,411 A | 11/1999 | Feng et al. |
| 5,978,348 A | 11/1999 | Tamura |
| 5,990,197 A | 11/1999 | Escano et al. |
| 6,010,564 A | 1/2000 | Zhu et al. |
| 6,045,649 A | 4/2000 | Weihrauch |
| 6,066,216 A | 5/2000 | Ruppel, Jr. |
| 6,077,377 A | 6/2000 | Bentz et al. |
| 6,117,613 A | 9/2000 | Kawauchi et al. |
| 6,127,475 A | 10/2000 | Vollenberg et al. |
| 6,136,079 A | 10/2000 | Evans et al. |
| 6,140,477 A | 10/2000 | Matsumoto et al. |
| 6,149,719 A | 11/2000 | Houle |
| 6,162,374 A | 12/2000 | Schoen et al. |
| 6,174,356 B1 | 1/2001 | Evans et al. |
| 6,183,549 B1 | 2/2001 | Wight |
| 6,190,422 B1 | 2/2001 | Carr |
| 6,193,833 B1 | 2/2001 | Gizowski et al. |
| 6,214,916 B1 | 4/2001 | Mercx et al. |
| 6,214,917 B1 | 4/2001 | Linzmeier et al. |
| 6,220,673 B1 | 4/2001 | Russell et al. |
| 6,248,161 B1 | 6/2001 | Nguyen et al. |
| 6,290,551 B1 | 9/2001 | Nguyen |
| 6,521,688 B1 | 2/2003 | Linzmeier et al. |
| 2002/0123952 A1 | 9/2002 | Sallavanti et al. |
| 2003/0062117 A1 | 4/2003 | Frieder, Jr. |
| 2003/0130381 A1 | 7/2003 | Joachimi et al. |

FOREIGN PATENT DOCUMENTS

| | | |
|---|---|---|
| DE | 1 479 239 | 12/1965 |
| DE | 1629225 | 6/1966 |
| DE | 38 13 570 | 11/1989 |
| DE | 44 32 081 | 3/1996 |
| DE | 196 29 675 | 7/1996 |
| EP | 126 787 | 12/1984 |
| EP | 0 159 169 | 10/1985 |
| EP | 0 282 181 A2 | 9/1988 |
| EP | 0 483 569 | 5/1992 |
| EP | 0483 569 A1 | 5/1992 |
| EP | 0 705 682 | 9/1995 |
| EP | 1 029 650 | 2/2000 |
| EP | 1098751 | 5/2001 |
| GB | 2 276 584 | 10/1994 |
| JP | 62-142092 | 6/1987 |
| JP | 06-297828 | 10/1994 |
| JP | 08-230043 | 9/1996 |
| JP | 09-220765 | 8/1997 |
| JP | 10166452 | 6/1998 |
| WO | WO 98/02294 | 1/1998 |
| WO | WO 00/20157 | 4/2000 |
| WO | WO 01/07524 | 2/2001 |

OTHER PUBLICATIONS

By Jones IA and Hilton PA, Sallavanti, R., Griffiths J., "Use of Infared Dyes for Transmission Laser Welding of Plastics", ICALEO Conference, Nov. 1999.

AVECIA Infra Red Dyes Product Description; http://www.avecia.com/infrared/products.htm, Apr. 27, 2001.

By U. A. Russek—Laser Beam Welding of Polymers with High Power Diode Lasers Joining Innovation for Micro and Macro Technologies; Fraunhofer-Institut fur Lasertechnik ILT, Steinbachstr. Germany 2000.

* cited by examiner

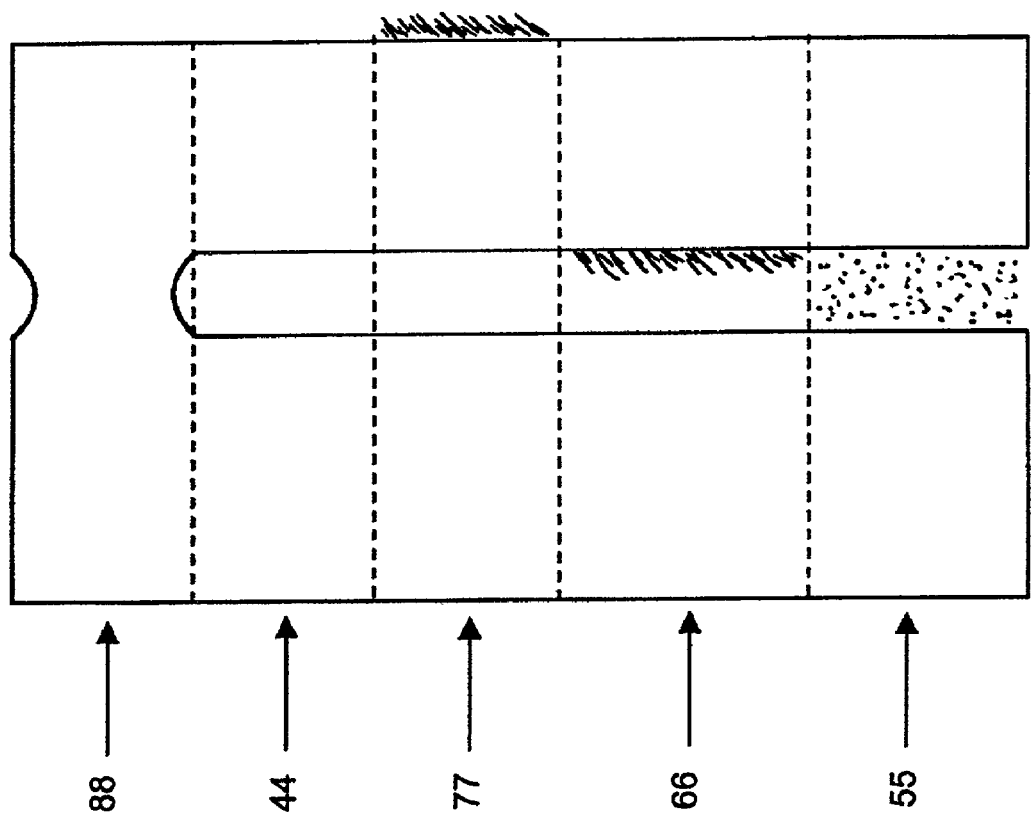

PRE-PROCESSED WORKPIECE HAVING A SURFACE DEPOSITION OF ABSORBER DYE RENDERING THE WORKPIECE WELD-ENABLED

BACKGROUND OF THE INVENTION

1. Field of the Invention

The invention relates to a pre-processed workpiece having a surface deposition of absorber dye for the express purpose of being consumed in future welding process. More particularly, it relates to the mechanical and chemical characteristics of the workpiece that are designed and engineered for exceptional energy conversion efficiency during irradiation.

2. Description of the Prior Art

Joining plastic parts by through transmission laser welding in known, for example, from U.S. Pat. No. 5,893,959. U.S. Pat. No. 5,893,959 utilizes pigments to increase the absorption properties along the welding zone. However, since the disclosed pigments survive the welding process, they unfavorably affect the appearance of the joint. The patent compensates for reduced aesthetics by incorporating the pigment into the entirety of both upper and lower substrates to render them opaque, both before and after joining. The upper substrate is described as having a concentration of pigment throughout of less than 1% that provides a transmission of greater than 60% at the welding laser wavelength. The lower substrate receives a pigment concentration of between 1–2% resulting in a negligible transmission.

Accordingly, it would be desirable to define the range of design criteria and engineering characteristics of a weldable workpiece that can: provide minimal occlusion at the joint, and may further include visual, even optical, clarity at the joint; selectively deposit absorber dye only onto the welding zone to eliminate absorber-induced occlusion throughout the remainder of the ensemble; incorporate dyes in such a way that they will undergo decomposition into inert, soluble, invisible by-products; utilize absorber dyes which primarily effect transmission at the welding wavelength; utilize absorber dyes that minimally effect transmission at wavelengths numerically spaced from the welding wavelength; utilize absorber dyes that minimally effect transmission within the visible spectrum; and in certain embodiments, have no effect or even beneficial transmission effects within the visible spectrum.

The relationship between applications utilizing carbon black pigmentation and absorber dyes is discussed as a function of line energy in the Russek article entitled "Laser Beam Welding of Polymers with High Power Diode Lasers: Joining Innovation for Micro and Macro Technologies". The article proposes three dimensional, volumetric thermodynamic process modeling to address concerns in gap bridging during welding. A significant drawback of such approach is that the weld must be completed and cross-sectioned to obtain the energy density distribution, as shown in FIG. 6. Russek does not suggest the dye density on a single workpiece, nor does it suggest the range of energy per surface area that will correspond to the inherent capacity of the surface dye deposition. The published PCT application bearing International Application Number PCT/GB99/03241, discloses a process for welding parts having an infrared absorber dye sandwiched therebetween.

SUMMARY OF THE INVENTION

Accordingly, it would be desirable to determine the basic requirements to prepare a polymer workpiece so that is can be flexibly welded to another freely-selectable mating part.

It is therefore an object of the present invention to set forth the minimum mechanical and chemical requirements for such a polymer workpiece.

It is another object of the present invention to set forth the optical transmission properties of such workpiece under ideal conditions.

It is a further object of the present invention to set forth the method of forming an electromagnetic radiation energy director on the workpiece.

These and other related objects are achieved according to the invention by a first embodiment thereof, relating to the mechanical and chemical requirements for the workpiece.

A weldable workpiece having at least its surface made from a first polymer which softens on heating adapted for fusing to a material which softens on heating and is freely-selectable from a second polymer which is the same or similar to the first polymer or a different polymer which is at least locally mutually miscible with the surface of the first polymer, wherein the first polymer and the freely-selectable second polymer have overlapping melting temperature ranges. The workpiece has a surface extending across a bulk portion. An absorber dye possessing both strong absorption and a high extinction coefficient at a welding wavelength of a radiant energy source is deposited on or above the surface thereby defining a welding zone via a vehicle having necessary viscosity and which avoids undue interference with or occlusion of the welding zone. The deposition comprising a generally uniform density of about 5 to about 3000 nanograms of dye per $mm^2$ to provide predictable and consistent heating thereby rendering the workpiece weld-enabled. The welding zone has the capacity to convert inbound radiant energy at the welding wavelength over about 0.1 $J/mm^2$ into thermal energy via vibronic relaxation immediately followed by exothermic decomposition of at least a portion of the dye into inert, invisible by-products, the combination of which being capable of delivering (i) a first quantity of thermal energy directed in the direction of the bulk portion to elevate the surface into the melting temperature range of the surface and (ii) an approximately equal quantity of thermal energy directed in the opposite direction away from the bulk portion. The dye, the vehicle, the by-products, and the surface of the first polymer are mutually miscible. The workpiece, and any film, may be made from a thermoplastic polymer. The dye may be a visible light absorbing dye, a near infrared absorbing dye, an infrared absorbing dye, or combinations thereof. If the vehicle is a liquid solvent it must be capable of dissolving the absorber dye to provide uniform surface density. If the liquid vehicle delivers absorber dye below the surface, it should be to a depth sufficiently small to avoid foaming during welding. In liquid solvents, the absorber dye is present in a concentration of about $1 \times 10^{-2}$ to about $1 \times 10^{-4}$ grams per milliliter to deliver dye within the stated surface deposition density range following solvent evaporation.

These and other related objects are achieved according to the invention by a second embodiment thereof, relating to the optical properties of the workpiece.

A transmission-enhancing formulation disposed between a first reflective surface of a first radiant energy-transmissive workpiece having a first bulk portion and a second reflective surface of a second workpiece having a second bulk portion.

Both reflective surfaces are made of a polymer material which softens on heating, wherein the transmission at a welding wavelength of a radiant energy source along an optical path through the formulation and the bulk portions and the reflective surfaces is lower than the optical transmission through just the bulk portions and the reflective surfaces only. The first and second reflective surfaces are made of polymers having overlapping melting temperature ranges. The transmission-enhancing formulation includes a material system containing a radiant energy absorbing dye having an absorption band matched to the welding wavelength of the radiant energy source. The material system is capable of directing the lower optical transmission attributable to the formulation into thermal energy via successive electronic-to-thermal and chemical-to-thermal conversion activities, wherein the thermal energy is transferable into the reflective surfaces disposed within the same optical path as the material system. The thermal energy transfer is capable of welding the transmission-reducing reflective surfaces together into a transmission-enhancing region having the bulk portions optically fused together.

The transmission-enhanced region exhibits an optical transmission within the visible spectrum greater than the transmission through both portions and both reflective surfaces only. The transmission-enhanced region exhibits an optical transmission at selected wavelengths within the visible spectrum of about 10% more than, or 1.1 times greater than, the transmission through both portions and both reflective surfaces only.

The transmission-enhanced region exhibits a photopic transmission of about 10% more than, or 1.1 times greater than, the photopic transmission through both portions and both reflective surfaces only. The optical transmission along the optical path through the formulation is about 10% lower than, or 0.9 time less than, the optical transmission through the bulk portions and the reflective surfaces. The material system is mutually miscible with the reflective surfaces to avoid occluding the transmission-enhancing region. The mutual miscibility is measured by numerical proximity of the Hansen solubility parameters of the dye, the vehicle, the by-products and the reflective surfaces. The numerically proximate Hansen solubility factors provide minimal occlusion of the optical transmission within the transmission-enhancing region.

These and other related objects are achieved according to the invention by a third embodiment thereof, relating to the formation of a radiant energy director on the workpiece.

A method of preprocessing a workpiece made from a first polymer for the exclusive purpose of preparing it for a high-efficiency through transmission radiant energy welding operation fusing the workpiece to a mating panel made from a material which softens on heating and is freely selectable from a second polymer which is the same or similar to the first polymer or a different polymer which is at least locally miscible with the surface of the first polymer. The polymers have overlapping melting temperature ranges. In a first step, a radiant energy director is formed as a substantially laminar welding zone. Formation includes the steps of (i) selecting a first polymer which softens on heating and includes a bulk portion and a surface extending across the bulk portion, (ii) selecting a dye possessing both strong absorption and a high extinction coefficient at a welding wavelength of a radiant energy source, (iii) selecting a dye vehicle with sufficient viscosity to define the edge of the welding zone and avoid undue interference with the welding operation or occlusion of the ultimately fused portion, and (iv) depositing, via the dye vehicle, between 5 and 3000 nanograms of dye per $mm^2$ on or above the workpiece surface. The radiant energy director has the capacity to undergo electronic, chemical and mechanical transformations during the welding operation according to the following steps of (1) converting inbound radiant energy at said welding wavelength over about 0.1 Joule/$mm^2$ into thermal energy via vibronic relaxation, (2) exothermically decomposing at least a portion of said dye into inert, invisible by-products immediately following said converting step, and (3) during said converting and decomposing steps, delivering a first quantity of energy into the bulk portion to elevate the surface into the melting temperature range of the first polymer and delivering an approximately equal second quantity of energy in the opposite direction away from the bulk portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numeral denote similar components throughout the views:

FIG. 4 is a multi-part cross-sectional view of the workpiece and mating material illustrating conditions corresponding to each of the curves in FIG. 3.

DETAILED DESCRIPTION OF PREFERRED EMBODIMENTS

Figure 1:
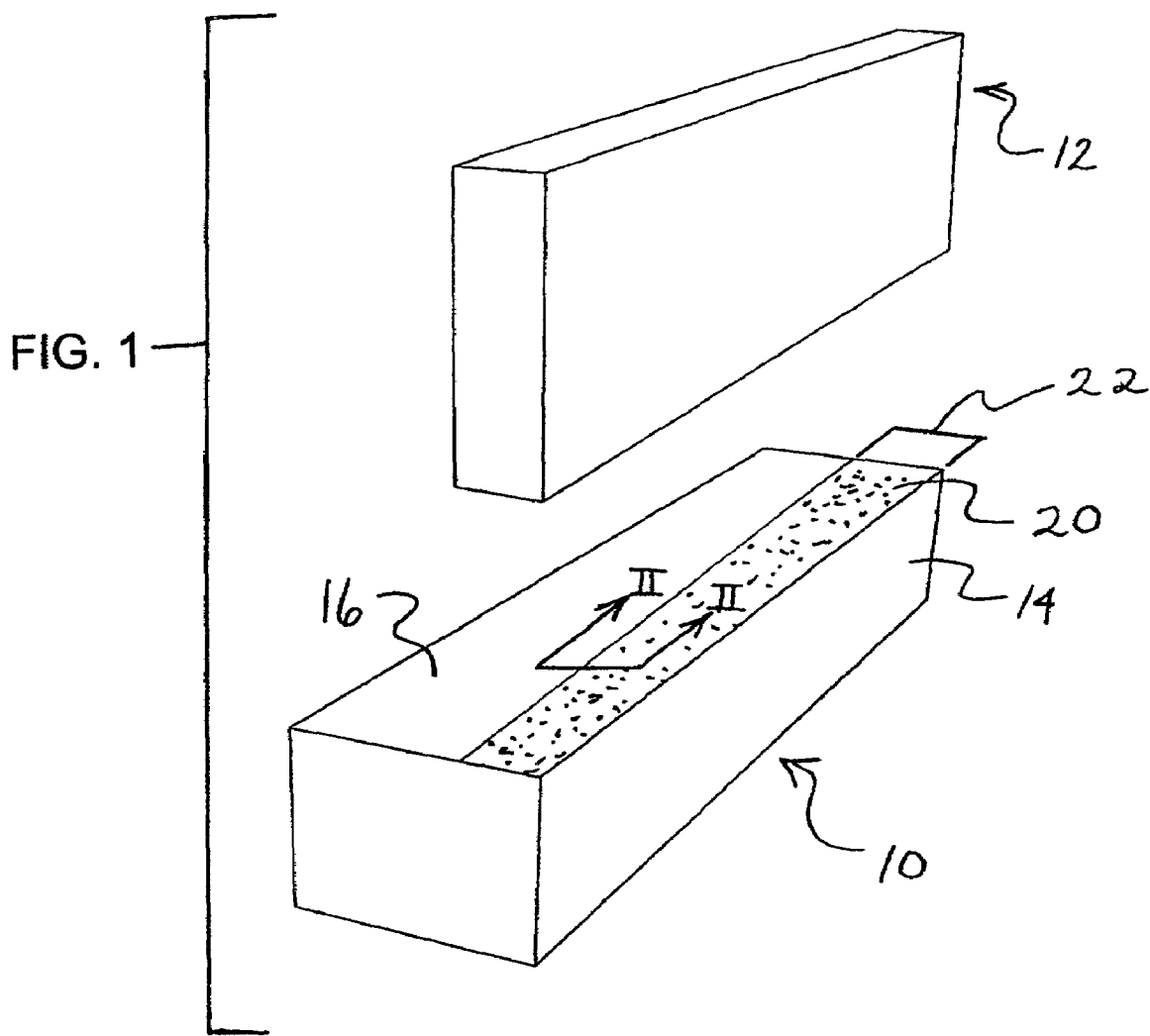
FIG. 1 is a perspective view of a pre-processed workpiece according to the invention having a surface deposition of absorber dye along one side thereof.

Referring now in detail to the drawings, and in particular FIG. 1, there is shown a prepared workpiece 10, designed for the express and ultimate purpose of being welded, at any future time, to a material made from a compatible polymer. In other words, workpiece 10 may be thought of as a work-in-process, wherein the workpiece has undergone some initial processing and may reside in inventory for an extended period of time awaiting further processing. This patent application shall cover the design and engineering characteristics of this workpiece which is adapted for bonding to a material via mutual heating of surface layers into their respective melting temperature ranges until the parts meld and fuse together. Though not specifically part of this patent application, the welding process consists of through transmission radiant energy welding. Such radiant energy may be provided from a number of sources including lasers operating in the visible, near infra-red, and infrared spectrums along with infrared lamps and infrared emitters. While lasers generally have narrower bandwidths than infrared lamps, the phrase "welding wavelength" as used herein, shall mean one or more wavelengths that the absorber and radiant energy source have in common for delivering thermal welding energy.

Workpiece and Mating Material Compatibility

Generally workpieces according to the invention are made from thermoplastic materials or a small group of thermoset plastics. Also included are textiles made from plastic or plastic fibers, or other fibers having plastic coatings. The inventive design of the workpiece comprises its ability to fuse its surface to a mating surface, effecting several polymer layers in each direction adjacent the surface. The main characteristic is that at least the surface of the workpiece softens upon heating, rather than decomposing. Similarly, the mating surface should soften upon heating. The workpiece and the mating material that it is adapted to weld to, should be mutually miscible polymers and should have melting temperature ranges that overlap.

Workpiece, Dye, and Related Chemical Components Compatibility

While the absorber dye may be placed onto the workpiece surface in solid form as a tape or film, particular utility results from application in liquid form. While the application process is not part of this invention, the resulting workpiece should not be limited in any way by the mention of a limited number of application processes, as the characteristics imparted from the application process can result from a multitude of application processes. For example, liquid dispensing or ink jet printing each provide a different aspect of flexibility, cost-effectiveness and uniformity for applying dye to a wide variety of surfaces, shapes, workpiece types, intended uses and combinations thereof.

For applications in liquid form, a solvent which substantially dissolves the dye to form an ink is required. Engineering requirements include proper viscosity, surface tension and drying time for the ink, all of which can effect how well defined the edge of the welding zone is. Following evaporation of the solvent, the dye remains on the surface along with additives, solvent residues and contaminants. Similarly, for applications in solid form, the dye is disposed on the surface along with the other constituents that make up the film or tape. As will be discussed in greater detail below, the dye may decompose during welding. Accordingly, it is a requirement that the additives, residues, contaminants, other constituents, dyes, decomposition products and other by-products of the application process, all be miscible in the surface polymers of the workpiece and mating material. It is a further requirement that none of these components interfere with the welding process, for example through heat sinking or mismatched melting temperature(s), or occlude the final weld.

The dyes are visible light absorbing, near infrared (NIR) absorbing or infrared (IR) absorbing dyes having high absorption and large extinction coefficients at the welding wavelength. At the same time, the dye should have low absorption and low coloration in regions other than the laser wavelength, particularly within the visible spectrum.

In one embodiment of the invention, one visible light absorbing dye is used with a matching visible light transmitting laser. Alternatively, a NIR absorbing dye is used with an NIR laser. Other sources of visible, NIR or IR radiant energy may be employed. While lasers operate at single wavelengths, IR lamps or IR emitters may operate at multiple wavelengths. Combinations of dyes may be used to absorb across a bandwidth that includes these multiple wavelengths. In addition, the exothermic energy of one dye may be used to trigger the decomposition of a second dye. Whether one or more than one dye is used, the key element is the efficient conversion of energy and low occlusion where optical transmission of the weld is an issue.

Referring again to FIGS. 1 and 2A, workpiece 10 includes a surface 16, representing the surface layers of interaction. Workpiece 10 also has a bulk portion 14, which is the bulk of the material below surface 16, and represents a non-reactive portion of workpiece 10. Workpiece 10 is designed and engineered for the exclusive and ultimate purpose of welding to a mating material 12.

Figure 2A:
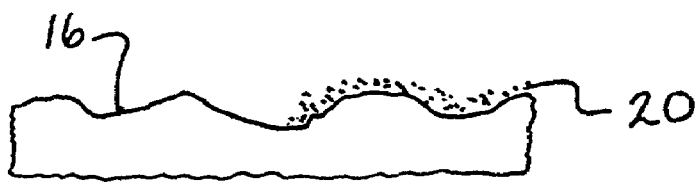
FIG. 2A is an enlarged cross-sectional view of the surface deposition, taken along the line II—II from FIG. 1.

An absorber dye 20 is deposited along surface 16. The presence of dye 20 defines a welding zone 22. In other words, the welding zone 22 is a region of surface 16 that is weld-enabled. At any future time a weld can be obtained along the welding zone 22 by properly placing a compatible polymer 12 into contact with surface 16 and exposing welding zone 22 to an amount of laser energy within the range according to the invention. FIG. 2A shows absorber dye present on surface 16 in the form of individual molecules, several molecular layers thick. The absorber dye is dissolved in an appropriate, compatible solvent and applied to surface 16. The solvent may cause the infusion of dye several molecular layers deep into surface 16, depending on the aggressiveness of the solvent with respect to the workpiece material. As these surface layers melt during welding the infused dye will encounter the melt flow in the joint region. Surprisingly, applicants discovered that slight infusion of dye is acceptable as long as the melt flow region subsequently reaches those infused dye molecules. However, if the dye infuses further into the surface, its heating remote from the melt flow region causes foaming that occludes the welded joint.

Figure 2B:
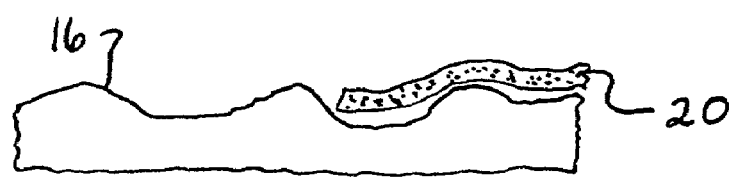
FIG. 2B is an enlarged cross-sectional view of an alternate embodiment of the surface deposition, taken along the line II—II from FIG. 1.

In the embodiment of FIG. 2B, infusion is totally avoided as the absorber dye is first incorporated into a thin film which is then placed onto surface 16. This embodiment also avoids any problems associated with having the dye/solvent solution running along the surface thereby diminishing the sharpness of the edge of the welding zone. The edge of the welding zone represents the boundary between weld-enabled portions of surface 16 and non weld-enabled portions.

Pre-Processing Examples

Figure 3:
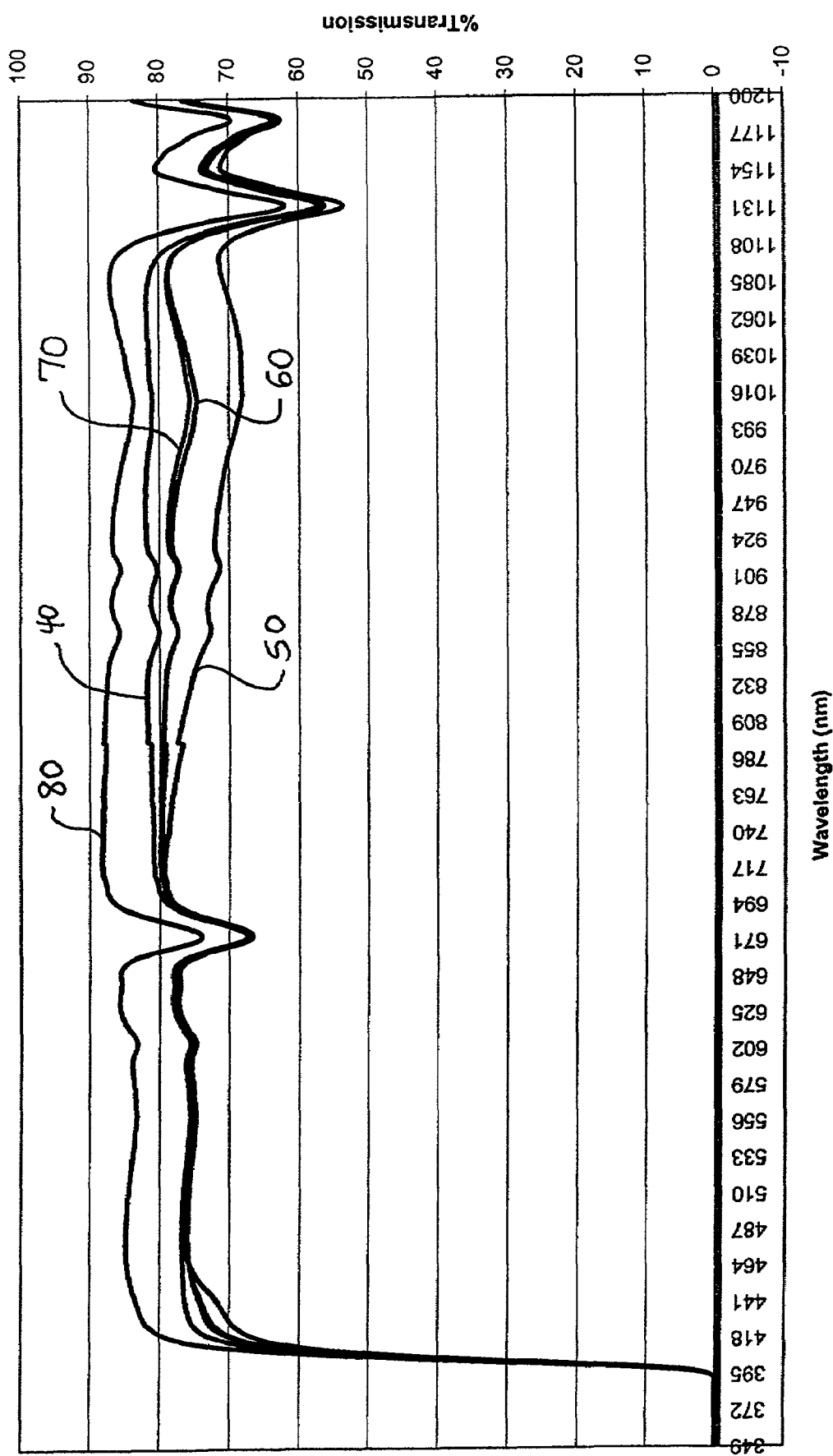
FIG. 3 is a graph showing transmission curves of various stages in the pre-processing of the workpiece along with transmission curves following electromagnetic irradiation.

FIG. 3 shows a series of transmission graphs wherein curve 40 is the transmission through a sample mating material 12 laid on top of a sample workpiece 10. Both samples were made of polycarbonate. Next a solution containing 1 gram per liter of absorber dye was applied to workpiece 10 forming a welding zone thereon. Curve 50 is the transmission through mating material 12 laid on top of workpiece 10 containing the absorber dye.

FIG. 4 shows the cross-sectional relationship of the panels with mating material 12 on the left and workpiece 10 on the right. Section 44 corresponds to curve 40. Section 55 corresponds to curve 50, where workpiece 10 is weld-enabled, and represents the lowest transmission values in the near infrared (NIR) and infrared (IR).

Post Processing Examples

Referring again to FIG. 3, curve 60 is the transmission through both panel following laser irradiation where the panels were not clamped together resulting in no weld. Curve 70 is the transmission through both panels following laser irradiation where the welding zone was facing out resulting in no weld. Curve 80 is the transmission through both panels following laser irradiation with the panels properly oriented and clamped, resulting in a successful weld.

In FIG. 4, section 66 corresponds to curve 60 and section 77 corresponds to curve 70. Note that the absorber dye 20 is partially or completely decomposed, but that no weld occurred. The test data indicates that a workpiece improperly clamped to the mating material 66 is equivalent to an improper orientation of the workpiece 77. In another test a Cyrolite acrylic was prepared for welding to a polyolefin. The workpiece failed to weld to the mating material as the melting temperature range of the polymers did not overlap, thereby preventing mutual miscibility from occurring. Section 88 corresponds to curve 80, wherein the dye has been decomposed and the reflective boundaries between workpiece 10 and mating material 12 have been fused together. The elimination of the transmission detracting reflective boundaries, results in the highest transmission values for the successfully welded section 88, as shown in curve 80.

In FIG. 3, at an exemplary diode laser welding wavelength of 940 nm, the transmission through both bulk portions and both reflective surfaces is 81.9%, corresponding to curve 40. The same measurement after introduction of the formulation is 71.8%, corresponding to curve 50. This difference is about 10% lower or about 0.9 times lower. Mis-welds, corresponding to curves 60 and 70, have about 78.4% transmission and a proper weld, corresponding to curve 80 possesses a 86.6% transmission.

At the exemplary Nd:YAG laser welding wavelength of 1064 nm, the transmission through both bulk portions and both reflective surfaces is 81.7%, corresponding to curve 40. The same measurement after introduction of the formulation is 69.1%, corresponding to curve 50. This difference is about 10% lower, and more specifically 12.6% lower. The difference is about 0.9 times lower and more specifically 0.8 times lower. Mis-welds, corresponding to curves 60 and 70, have about 77.5% transmission and a proper weld, corresponding to curve 80 possesses a 86.1% transmission.

An exemplary VIS wavelength is 550 nm which will also serve as an approximation of the photopic. All curves 40, 50, 60 and 70 are grouped within 0.3% of 75.3% transmission, illustrating the minimal effect of the introduction and decomposition following mis-welds on the visible spectrum. The proper weld yields a transmission of 83.4%. This is about 10% higher and about 1.1 times higher, for both the absolute measurements at 550 nm and for the photopic approximation. These percent transmission values are summarized in the following Table 1.

TABLE 1

| wavelength | Curve 40 Section 44 | Curve 50 Section 55 | Curve 60 Section 66 | Curve 70 Section 77 | Curve 80 Section 88 |
|---|---|---|---|---|---|
| 1064 nm | 81.7 | 69.1 | 77.5 | 77.5 | 86.1 |
| 940 nm | 81.9 | 71.8 | 78.4 | 78.4 | 86.6 |
| 550 nm | 75.3 | 75.3 | 75.3 | 75.3 | 83.4 |

The use of different polymers, different dyes, different vehicles and different dye densities, and different levels of irradiation will have varying results. In optical applications, these values are typical. Other lasers, including lasers operating in the visible spectrum may also be used.

Another example at 7 times the dye concentration, as measured at the liquid vehicle state, is shown in Table 2. The presence of additional dye is confirmed by low values of section 55 at the higher wavelengths. All other factors remain the same. After welding, note the excellent transmission in section 88 at 550 nm, comparable to the same measurement in Table 1, despite the presence of dye at the other wavelengths in section 88. Accordingly, this example illustrates partial exothermic decomposition with virtually no effect on visible or photopic transmission. At this dye concentration, additional capacity exists for use of greater amounts of thermal energy during welding, within the parameters according to the invention.

TABLE 2

| wavelength | Section 44 | Section 55 | Section 88 |
|---|---|---|---|
| 1064 nm | 82.7 | 34.0 | 75.4 |
| 940 nm | 82.9 | 36.4 | 74.5 |
| 550 nm | 77.9 | 76.0 | 84.0 |

In another series of tests, a particular dye was tested at high concentrations by painting onto polyurethane for welding to polycarbonate and in another instance painted onto PVC for welding to PVC. Laser power and weld speed were varied to adjust the weld energy per surface area, but no weld occurred. It is believed that the high concentration of dye and the painting technique delivered a surface density which was non-uniform and/or beyond the range specified according to the invention. When the same dye was uniformly loaded into a film at the concentration specified according to the invention, PMMA plates were readily welded together at dye concentrations spanning a 10-fold concentration, at film thicknesses spanning a 3-fold range, at laser powers spanning a 2.5-fold range, and at weld speeds spanning a 6.6-fold range. In terms of weld energy per surface area the range extended from 0.7 J/mm$^2$ to 11.4 J/mm$^2$, more than a 16-fold range, i.e. 2.5 times 6.6.

Other tests conducted within the parameters according to the invention successfully welded the following pairs of materials together:

| Workpiece | Mating Material |
|---|---|
| MDPE Film | LDPE coated paper board |
| Polypropylene film | ABA |
| Copolyester | PEN |
| Copolyester | Polypropylene |

Welding workpieces to mating materials made from the same polymer was more easily accomplished and includes: polycarbonate, polypropylene, PMMA, HDPE, acetal, TPE, polyetherimide, PEEK, polystyrene, nylon, and ABS. Since certain nylons have transmissions below 50%, and even 10%, it is impractical to measure changes in transmission on a scale of 10%. Accordingly, the 1.1 times and the 0.9 times transmission changes work well at measuring performance within the parameters of the invention, because the predicted behavior still occurs, even at low transmissions with opaque parts. Successful welding was achieved, for example, with lasers operating in the following spectrums: the visible spectrum with Nd:YAG doubled 532 nm, ruby laser 694 nm and visible diode lasers 670 nm; near infrared with GaAs lasers; and infrared with diode lasers at 808 nm, 940 nm and 980 nm; and the Nd:YAG 1064 nm.

As can be seen, a workpiece prepared according to the design and engineering parameters according to the invention provide a high tolerance and latitude for the ultimate welding process. Thus a single workpiece prepared according to the invention, can be flexibly utilized with different welding lasers at different power levels, and with different mating parts. It may be utilized in applications requiring high strength, high confidence of proper weld, and high optical or photopic transmissions values combined with low occlusion. In addition, in preparing the workpiece according the invention a wide range of dyes and delivery vehicles may be utilized as long as the solubility guidelines are followed. The inherent flexibility of the invention is in contrast to the prior art systems which typically dope parts with occluding pigments, have a single pigment or dye concentration level or treat the parts as matched pairs of the same material.

Thus, while there have shown and described and pointed out fundamental novel features of the invention as applied to preferred embodiments thereof, it will be understood that various omissions and substitutions and changes in the form and details of the methods described and devices illustrated, and in their applications, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that design and engineering criteria, their constituents and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A liquid solution in combination with a workpiece having a reflective surface made from a first thermoplastic polymer which softens on heating comprising:

(a) said thermoplastic workpiece having a bulk portion with said reflective surface extending across said bulk portion;

(b) an absorber dye possessing both strong absorption and a high extinction coefficient at a welding wavelength of a radiant energy source, wherein said dye is selected from the group consisting of a visible light absorbing dye, a near infrared absorbing dye, an infrared absorbing dye, and combinations thereof;

(c) a liquid solution containing said dye at a concentration of between 0.01 and 0.0001 grams/ml deposited on or above said workpiece surface via one of liquid dispensing and ink jet printing with said liquid solution having additives to adjust viscosity, surface tension and drying time to provide a substantially laminar welding zone with a defined edge comprising a generally uniform density of about 5 to about 3000 nanograms of dye per $mm^2$ thereby rendering said reflective surface weld-enabled, said liquid solution containing a compatible solvent, wherein the solvent residue and said additives are mutually miscible with the reflective surface thereby avoiding photopic occlusion; and (d) said laminar welding zone having the capacity to convert inbound radiant energy at said welding wavelength between about 0.1 $J/mm^2$ and 11.4 $J/mm^2$ into thermal energy, wherein said additives comprises non heat-sinking additives so that the radiant energy is adapted to weld said reflective surface to a mating thermoplastic workpiece to form an optically fused portion having a 10% greater photopic transmission than the separate workpieces.

2. The workpiece of claim 1, wherein said liquid solution delivers a portion of said absorber dye below said surface by infusing the dye several molecular layers deep, whereby the laminar welding zone is adapted to provide a melt flow to a depth that encounters said infused dye so that foaming during welding is avoided.

* * * * *

UNITED STATES PATENT AND TRADEMARK OFFICE
CERTIFICATE OF CORRECTION

| | | |
|---|---|---|
| PATENT NO. | : 7,201,963 B2 | Page 1 of 1 |
| APPLICATION NO. | : 10/047006 | |
| DATED | : April 10, 2007 | |
| INVENTOR(S) | : Scott M. Hartley et al. | |

It is certified that error appears in the above-identified patent and that said Letters Patent is hereby corrected as shown below:

In Column 10, Claim 1, Letter (c), Line 8 after grams/ delete "mi" and insert -- ml --.

Signed and Sealed this

Twenty-ninth Day of May, 2007

JON W. DUDAS
*Director of the United States Patent and Trademark Office*